United States Patent
Takeuchi et al.

(10) Patent No.: US 10,767,272 B2
(45) Date of Patent: Sep. 8, 2020

(54) WATER ELECTROLYSIS SYSTEM AND METHOD OF STOPPING OPERATION THEREOF

(71) Applicant: HONDA MOTOR CO., LTD., Minato-ku, Tokyo (JP)

(72) Inventors: Jun Takeuchi, Wako (JP); Daisuke Kurashina, Wako (JP); Yukihiro Fukushima, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 119 days.

(21) Appl. No.: 16/034,480

(22) Filed: Jul. 13, 2018

(65) Prior Publication Data

US 2019/0024248 A1    Jan. 24, 2019

(30) Foreign Application Priority Data

Jul. 19, 2017    (JP) ................. 2017-139861

(51) Int. Cl.
| | |
|---|---|
| C25B 15/02 | (2006.01) |
| C25B 9/06 | (2006.01) |
| C25B 1/04 | (2006.01) |
| C25B 1/12 | (2006.01) |

(52) U.S. Cl.
CPC ............... C25B 15/02 (2013.01); C25B 1/04 (2013.01); C25B 1/12 (2013.01); C25B 9/06 (2013.01)

(58) Field of Classification Search
CPC .................. C25B 15/02; C25B 1/04–12
See application file for complete search history.

(56) References Cited

U.S. PATENT DOCUMENTS

2012/0255868 A1* 10/2012 Takeuchi ............ C25B 1/12
205/628
2018/0202053 A1 7/2018 Harano et al.

FOREIGN PATENT DOCUMENTS

| JP | 2012-067343 | 4/2012 |
|---|---|---|
| JP | 2012-219276 | 11/2012 |
| JP | 2013-241638 | 12/2013 |
| WO | 2017/056277 | 4/2017 |

OTHER PUBLICATIONS

Japanese Office Action for Japanese Patent Application No. 2017-139861 dated Feb. 26, 2019.

* cited by examiner

*Primary Examiner* — Nicholas A Smith
(74) *Attorney, Agent, or Firm* — Amin, Turocy & Watson, LLP

(57) ABSTRACT

A water electrolysis system is equipped with a water electrolysis device, a water supply passage, a hydrogen supply passage, a gas-liquid separator, a first water drainage passage, a first water drainage valve, a second water drainage valve, a determination unit, and a valve control unit. In a method of stopping operation of the water electrolysis system, in a water drainage step, in the case that the determination unit determines that operation of the water electrolysis device has been stopped, the first water drainage valve is controlled to be placed in a valve open state, thereby draining liquid water from the gas-liquid separator into the first water drainage passage.

11 Claims, 10 Drawing Sheets

WATER ELECTROLYSIS SYSTEM AND METHOD OF STOPPING OPERATION THEREOF

CROSS-REFERENCE TO RELATED APPLICATION

This application is based upon and claims the benefit of priority from Japanese Patent Application No. 2017-139861 filed on Jul. 19, 2017, the contents of which are incorporated herein by reference.

BACKGROUND OF THE INVENTION

Field of the Invention

The present invention relates to a water electrolysis system for generating oxygen and hydrogen by performing electrolysis on supplied water, as well as a method for stopping operation of such a water electrolysis system.

Description of the Related Art

In general, hydrogen is used as a fuel gas that is used in a power generating reaction of a fuel cell. Such hydrogen is produced, for example, by the water electrolysis system disclosed in Japanese Laid-Open Patent Publication No. 2012-067343. Such a water electrolysis system is equipped with a water electrolysis device that generates oxygen and hydrogen gas by performing electrolysis on water (pure water).

The hydrogen gas produced by the water electrolysis device is delivered to a gas-liquid separator together with a small amount of pure water. In the gas-liquid separator, liquid water (pure water) is separated from the hydrogen gas and stored. A drain pipe is connected to the lower part of the gas-liquid separator, and a water drainage valve is disposed in the drain pipe.

SUMMARY OF THE INVENTION

In the above-described water electrolysis system, when operation of the water electrolysis device is stopped, the pressure of the hydrogen gas in the water electrolysis device is released, whereas the liquid water that was separated from the hydrogen gas remains present inside the gas-liquid separator. Therefore, in order to prevent the liquid water from freezing inside the gas-liquid separator in a cold climate or during winter or the like, when operation of the water electrolysis device is stopped, such a water electrolysis system requires a heater in order to maintain the gas-liquid separator at a warm temperature. However, if such a heater is used, there is a problem in that the configuration of the water electrolysis system becomes complicated.

The present invention has been devised taking into consideration the aforementioned problem, and has the object of providing a water electrolysis system which is capable of, with a simple structure, preventing liquid water from freezing in a gas-liquid separator at a time that operation of the water electrolysis device is stopped, as well as to a method of stopping operation of the water electrolysis system.

In order to achieve the aforementioned object, a water electrolysis system according to an aspect of the present invention includes a water electrolysis device configured to generate hydrogen and oxygen by performing electrolysis on supplied water, a water supply passage configured to supply the water to the water electrolysis device, a hydrogen supply passage configured to supply the hydrogen which was generated by the water electrolysis device to a hydrogen storage device, a gas-liquid separator disposed in the hydrogen supply passage and configured to separate the hydrogen into a gas and a liquid, a water drainage passage configured to drain liquid water separated from the hydrogen and stored in the gas-liquid separator, a water drainage valve configured to be switched between a valve open state in which the water drainage passage is opened, and a valve closed state in which the water drainage passage is closed, and a control unit, wherein the control unit includes a determination unit configured to determine whether or not operation of the water electrolysis device has been stopped, and a valve control unit configured to, in the case that the determination unit has determined that operation of the water electrolysis device has been stopped, control the water drainage valve to be placed in the valve open state.

In accordance with such a configuration, since the liquid water inside the gas-liquid separator is capable of being drained into the drainage passage when operation of the water electrolysis device is stopped, freezing of the liquid water inside the gas-liquid separator can be suppressed with a simple configuration.

In the above-described water electrolysis system, the hydrogen generated from the water electrolysis device may have a pressure higher than atmospheric pressure, the water drainage passage may have a first flow path and a second flow path disposed mutually in parallel, and the water drainage valve may include a first water drainage valve configured to be switched between a valve open state in which the first flow path is opened, and a valve closed state in which the first flow path is closed, and a second water drainage valve configured to be switched between a valve open state in which the second flow path is opened, and a valve closed state in which the second flow path is closed, wherein a pressure loss of the second flow path is set to be smaller than a pressure loss of the first flow path, and in the case that the determination unit has determined that operation of the water electrolysis device has been stopped, the valve control unit may control the first water drainage valve to be placed in the valve open state and also control the second water drainage valve to be placed in the valve closed state, and thereafter controls the second water drainage valve to be placed in the valve open state.

In accordance with such a configuration, immediately after operation of the water electrolysis device has been stopped (when the pressure inside the gas-liquid separator is relatively high), the liquid water inside the gas-liquid separator can be drained while lowering the pressure in the first flow path. In addition, when the pressure inside the gas-liquid separator decreases, it is possible to smoothly drain the liquid water inside the gas-liquid separator into the second flow path.

The above-described water electrolysis system may further include a water sealing unit configured to store the liquid water led from the first flow path and the second flow path, a water sealing unit drainage passage configured to discharge the liquid water inside the water sealing unit, a pressure release passage configured to connect the hydrogen supply passage or the gas-liquid separator with the water sealing unit; and a pressure release valve configured to be switched between a valve open state in which the pressure release passage is opened, and a valve closed state in which the pressure release passage is closed, wherein, in the case that the determination unit has determined that operation of the water electrolysis device has been stopped, the valve control unit may control the pressure release valve to be placed in the valve open state, after having introduced the liquid water inside the gas-liquid separator into the water sealing unit via the water drainage passage.

In accordance with such a configuration, since the hydrogen inside the hydrogen supply passage can be introduced into the water sealing unit via the pressure release passage, the pressure inside the water sealing unit can be increased. Consequently, using the hydrogen inside the water sealing unit, it is possible to smoothly drain the liquid water inside the water sealing unit into the water sealing unit drainage passage.

The above-described water electrolysis system may further include a water supplying gas-liquid separator which is disposed in the water supply passage, and into which the liquid water is guided from the water sealing unit drainage passage, an exhaust passage configured to discharge gas in the water supplying gas-liquid separator, a hydrogen detector disposed in the exhaust passage and configured to detect hydrogen in the exhaust passage, and a water sealing unit drainage valve configured to be switched between a valve open state in which the water sealing unit drainage passage is opened, and a valve closed state in which the water sealing unit drainage passage is closed, wherein the valve control unit may control the water sealing unit drainage valve to be placed in the valve open state in a state in which the pressure release valve is open, and may control the water sealing unit drainage valve to be placed in the valve closed state when hydrogen is detected by the hydrogen detector.

In accordance with such a configuration, since the water sealing unit drainage valve is placed in a valve open state with the pressure release valve being in a valve open state, all of the liquid water inside the water sealing unit is introduced into the water supplying gas-liquid separator, and thereafter the hydrogen inside the water sealing unit is introduced into the water supplying gas-liquid separator. Then, since the water sealing unit drainage valve is placed in a valve closed state when hydrogen is detected by the hydrogen detector, all of the liquid water inside the water sealing unit can be reliably drained into the water supplying gas-liquid separator. Accordingly, with a simple configuration, freezing of the liquid water inside the gas-liquid separator and the water drainage system (the water drainage passage, the water sealing unit, and the water sealing unit drainage passage) can be suppressed when operation of the water electrolysis device is stopped. Further, it is possible to prevent leakage of hydrogen to the exterior.

The above-described water electrolysis system may further include a first power source configured to apply an electrolysis voltage to the water electrolysis device, and a second power source configured to supply electrical power to the control unit at a time of a power failure of the first power source, wherein the determination unit may determine that operation of the water electrolysis device has been stopped when a power failure occurs in the first power source.

In accordance with such a configuration, even if a power failure occurs in the first power source, the liquid water inside the gas-liquid separator can be drained into the water drainage passage.

In the above-described water electrolysis system, a first pressure loss unit may be disposed in the first flow path, a second pressure loss unit may be disposed in the second flow path, and a pressure loss of the second pressure loss unit may be set to be smaller than a pressure loss of the first pressure loss unit.

In a method of stopping operation of a water electrolysis system according to another aspect of the present invention, the water electrolysis system includes a water electrolysis device configured to generate hydrogen and oxygen by performing electrolysis on supplied water, a water supply passage configured to supply the water to the water electrolysis device, a hydrogen supply passage configured to supply the hydrogen which was generated by the water electrolysis device to a hydrogen storage device, a gas-liquid separator disposed in the hydrogen supply passage and configured to separate the hydrogen into a gas and a liquid, a water drainage passage configured to drain liquid water separated from the hydrogen and stored in the gas-liquid separator, and a water drainage valve configured to be switched between a valve open state in which the water drainage passage is opened, and a valve closed state in which the water drainage passage is closed, and the method includes a determination step of determining whether or not operation of the water electrolysis device has been stopped, and a water drainage step of placing the water drainage valve in the valve open state when it is determined in the determination step that operation of the water electrolysis device has been stopped, thereby draining the liquid water from the gas-liquid separator into the water drainage passage.

In the above-described method of stopping operation of the water electrolysis system, the hydrogen generated from the hydrogen supply passage may have a pressure higher than atmospheric pressure, the water drainage passage may have a first flow path and a second flow path disposed mutually in parallel, and the water drainage valve may include a first water drainage valve configured to be switched between a valve open state in which the first flow path is opened, and a valve closed state in which the first flow path is closed, and a second water drainage valve configured to be switched between a valve open state in which the second flow path is opened, and a valve closed state in which the second flow path is closed, wherein a pressure loss of the second flow path is set to be smaller than a pressure loss of the first flow path. Further, the water drainage step may include a first water drainage step of placing the first water drainage valve in the valve open state, and placing the second water drainage valve in the valve closed state when it is determined in the determination step that operation of the water electrolysis device has been stopped, thereby draining the liquid water from the gas-liquid separator into the first flow path, and a second water drainage step of placing the second water drainage valve in the valve open state after the first water drainage step, thereby draining the liquid water from the gas-liquid separator into the second flow path.

In the above-described method of stopping operation of the water electrolysis system, the water electrolysis system may further include a water sealing unit configured to store the liquid water led from the first flow path and the second flow path, a water sealing unit drainage passage configured to discharge the liquid water inside the water sealing unit, a pressure release passage configured to connect the hydrogen supply passage or the gas-liquid separator with the water sealing unit, and a pressure release valve configured to be switched between a valve open state in which the pressure release passage is opened, and a valve closed state in which the pressure release passage is closed. In addition, the water drainage step may include a pressure releasing step of placing the pressure release valve in the valve open state after the second water drainage step, thereby introducing the hydrogen into the water sealing unit, and a third water drainage step of draining the liquid water from the water sealing unit into the water sealing unit drainage passage, by the hydrogen that was introduced into the water sealing unit in the pressure releasing step.

In the above-described method of stopping operation of the water electrolysis system, the water electrolysis system may further include a water supplying gas-liquid separator which is disposed in the water supply passage, and into which the liquid water is guided from the water sealing unit drainage passage, an exhaust passage configured to discharge gas in the water supplying gas-liquid separator, a hydrogen detector disposed in the exhaust passage and configured to detect hydrogen in the exhaust passage, and a water sealing unit drainage valve configured to be switched between a valve open state in which the water sealing unit drainage passage is opened, and a valve closed state in which the water sealing unit drainage passage is closed, wherein, in the third water drainage step, the water sealing unit drainage valve may be placed in the valve open state in a state in which the pressure release valve is open, whereby the liquid water is guided from the water sealing unit to the water supplying gas-liquid separator via the water sealing unit drainage passage, and after the third water drainage step, when hydrogen is detected by the hydrogen detector, a water drainage stopping step of placing the water sealing unit drainage valve in the valve closed state is performed.

In the above-described method of stopping operation of the water electrolysis system, the water electrolysis system may further include a first power source configured to apply an electrolysis voltage to the water electrolysis device, and a second power source configured to supply electrical power at a time of a power failure of the first power source, wherein, in the determination step, it may be determined that operation of the water electrolysis device has been stopped when a power failure occurs in the first power source, and in the water drainage step, the water drainage valve may be controlled by electrical power supplied from the second power source.

In the above-described method of stopping operation of the water electrolysis system, the second water drainage step may be performed after a water level of the liquid water inside the gas-liquid separator has reached a water drainage limit point in the first water drainage step.

In the above-described method of stopping operation of the water electrolysis system, the pressure releasing step may be performed after a water level inside the gas-liquid separator has reached a lower limit value and a water level inside the water sealing unit has stopped rising.

According to the present invention, since the liquid water inside the gas-liquid separator is capable of being drained into the drainage passage when operation of the water electrolysis device is stopped, freezing of the liquid water inside the gas-liquid separator can be suppressed with a simple configuration.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

Preferred embodiments of a water electrolysis system and a method of stopping operation thereof according to the present invention will be presented and described below with reference to the accompanying drawings.

Figure 1:
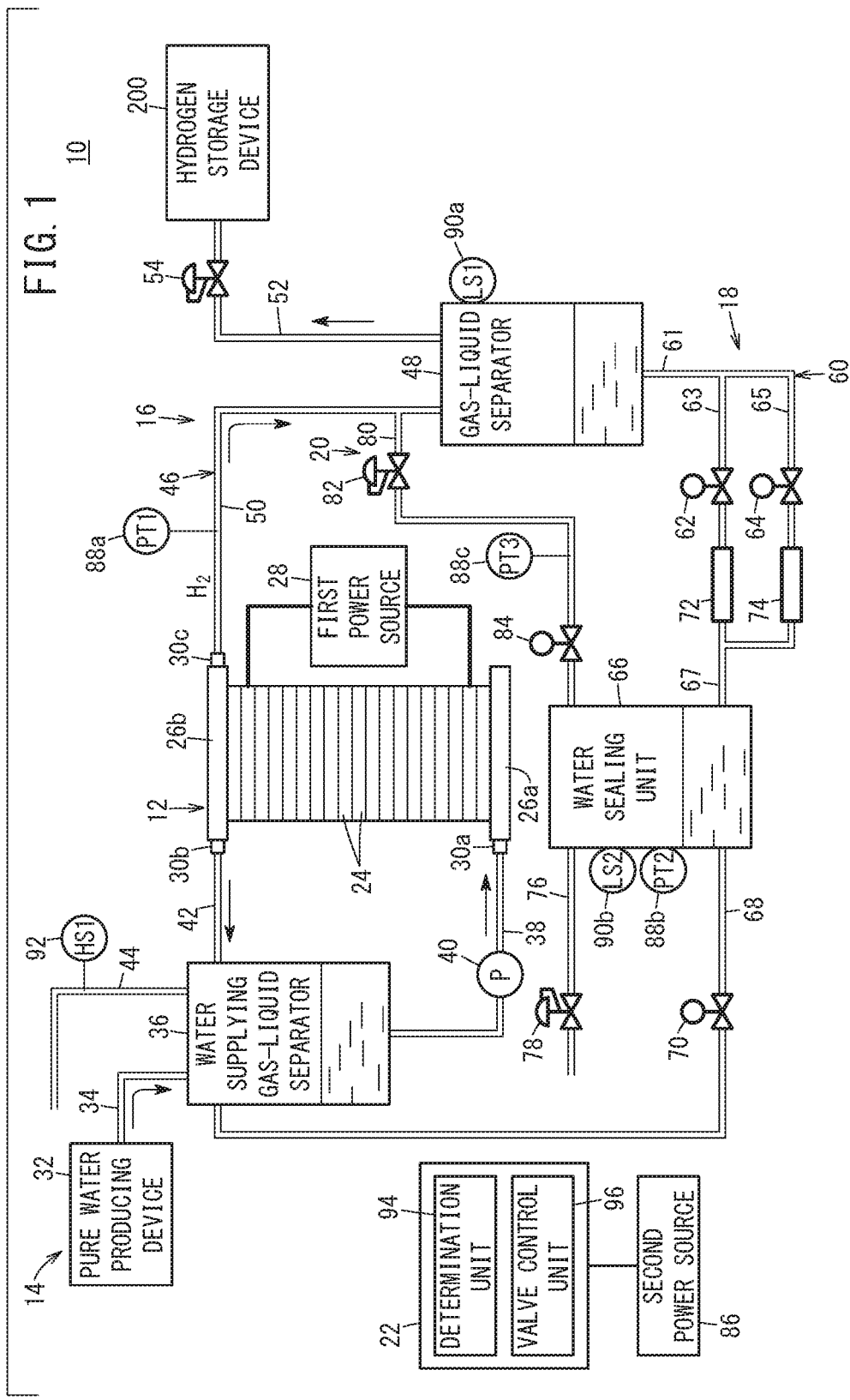
FIG. 1 is a schematic configuration explanatory diagram of a water electrolysis system according to an embodiment of the present invention.

As shown in FIG. 1, the water electrolysis system 10 according to an embodiment of the present invention is configured as a differential pressure type high pressure water electrolysis system, and is equipped with a water electrolysis device 12, a water supplying system 14, a hydrogen supplying system 16, a water drainage system 18, a pressure release system 20, and a control unit 22.

The water electrolysis device 12 is a differential pressure type high pressure water electrolysis device which generates oxygen and high pressure hydrogen by performing electrolysis on supplied water (pure water). The high pressure hydrogen has a pressure higher than atmospheric pressure. More specifically, the term "high pressure hydrogen" refers to hydrogen gas having a high pressure, for example, 1 MPa to 70 MPa, which is higher than the oxygen pressure that is a normal pressure.

The water electrolysis device 12 includes a plurality of water decomposing cells 24 stacked together, and end plates 26$a$, 26$b$ disposed at both ends in a stacking direction of the water decomposing cells 24. The water electrolysis device 12 is electrically connected to a first power source 28 which is a DC power source.

Although detailed illustration thereof is omitted, each of the water decomposing cells 24 includes a configuration in which a membrane electrode assembly is sandwiched between an anode side separator and a cathode side separator. The membrane electrode assembly, for example, includes a solid polymer electrolyte membrane (ion exchange membrane) in which a thin film of perfluorosulfonic acid is impregnated with water. An anode side current collector is disposed on one surface of the solid polymer electrolyte membrane, and a cathode side current collector is disposed on another surface of the solid polymer electrolyte membrane.

An anode side inlet 30$a$ for supplying water to the anode side current collector is provided in the end plate 26$a$. An anode side outlet 30$b$, through which oxygen generated by a reaction and unreacted water flow, and a cathode side outlet 30c, through which hydrogen generated by the reaction flows, are provided in the end plate 26b.

The water supplying system 14 includes a pure water producing device 32, a pure water introduction passage 34, a water supplying gas-liquid separator 36, a water supply passage 38, a circulation pump 40, a discharge passage 42, and an exhaust passage 44.

The pure water producing device 32 produces pure water from tap water or the like. The pure water introduction passage 34 is a passage for introducing the pure water produced by the pure water producing device 32 into the water supplying gas-liquid separator 36. The water supplying gas-liquid separator 36 is configured to be capable of storing water.

The water supply passage 38 is a passage for guiding the water stored in the water supplying gas-liquid separator 36 to the water electrolysis device 12. The water supply passage 38 is connected to the anode side inlet 30a of the end plate 26a. The circulation pump 40 is disposed in the water supply passage 38, and transfers the water in the water supplying gas-liquid separator 36 to the water electrolysis device 12.

The discharge passage 42 is a passage that mutually connects the anode side outlet 30b of the end plate 26b and an upper portion of the water supplying gas-liquid separator 36 to each other. The discharge passage 42 guides the oxygen generated by the reaction and the unreacted water to the water supplying gas-liquid separator 36. The exhaust passage 44 is connected to the upper portion of the water supplying gas-liquid separator 36. The exhaust passage 44 is a passage for discharging gases (oxygen and hydrogen) in the water supplying gas-liquid separator 36 to the exterior.

The hydrogen supplying system 16 includes a hydrogen supply passage 46, and a gas-liquid separator 48 disposed in the hydrogen supply passage 46. The hydrogen supply passage 46 is a passage for supplying the hydrogen generated in the water electrolysis device 12 to a hydrogen storage device 200. The hydrogen supply passage 46 includes a first hydrogen supply passage 50 and a second hydrogen supply passage 52. The first hydrogen supply passage 50 mutually connects the cathode side outlet 30c and the gas-liquid separator 48 to each other. The second hydrogen supply passage 52 mutually connects the gas-liquid separator 48 and the hydrogen storage device 200 to each other. A back pressure valve 54 which is set at a specified pressure value (for example, 70 MPa) is provided in the second hydrogen supply passage 52.

The gas-liquid separator 48 performs gas-liquid separation on the hydrogen that is introduced thereto from the first hydrogen supply passage 50. The gas-liquid separator 48 is configured to be capable of storing liquid water that is separated from the hydrogen. The first hydrogen supply passage 50 and the second hydrogen supply passage 52 are connected to an upper portion of the gas-liquid separator 48. Hydrogen (high-pressure hydrogen), from which moisture has been removed by the gas-liquid separator 48, is supplied to the hydrogen storage device 200 via the second hydrogen supply passage 52.

The water drainage system 18 includes a first water drainage passage 60 (water drainage passage), a first water drainage valve 62, a second water drainage valve 64, a water sealing unit 66, a second water drainage passage 68 (water sealing unit drainage passage), and a third water drainage valve 70 (water sealing unit drainage valve).

The first water drainage passage 60 is a passage for guiding the liquid water inside the gas-liquid separator 48 to the water sealing unit 66. The first water drainage passage 60 includes an outlet path 61, a first flow path 63, a second flow path 65, and a connecting path 67. The outlet path 61 is connected to a lower portion of the gas-liquid separator 48. The first flow path 63 and the second flow path 65 are disposed mutually in parallel, and connect the outlet path 61 and the connecting path 67 to each other. The connecting path 67 is connected to the water sealing unit 66.

In the first flow path 63, the first water drainage valve 62 and a first pressure loss unit 72 are disposed along the flow direction of the liquid water (in a direction from the gas-liquid separator 48 toward the water sealing unit 66). The first water drainage valve 62 is an on-off valve (solenoid valve) that can be switched between a valve open state in which the first flow path 63 is opened, and a valve closed state in which the first flow path 63 is closed. The first pressure loss unit 72 is a pressure reducing member that reduces the pressure of the liquid water that flows through the first flow path 63, and is configured in a tubular shape. The first pressure loss unit 72 may also be in the form of an orifice or a pressure reducing valve.

In the second flow path 65, the second water drainage valve 64 and a second pressure loss unit 74 are disposed along the flow direction of the liquid water (in a direction from the gas-liquid separator 48 toward the water sealing unit 66). The second water drainage valve 64 is an on-off valve (solenoid valve) that can be switched between a valve open state in which the second flow path 65 is opened, and a valve closed state in which the second flow path 65 is closed. The second pressure loss unit 74 is a pressure reducing member that reduces the pressure of the liquid water that flows through the second flow path 65, and is configured in a tubular shape. The second pressure loss unit 74 may also be in the form of an orifice or a pressure reducing valve. The pressure loss of the second pressure loss unit 74 is set to be smaller than the pressure loss of the first pressure loss unit 72. More specifically, the pressure loss in the second flow path 65 is smaller than the pressure loss in the first flow path 63.

The water sealing unit 66 is configured to be capable of storing the liquid water that is guided thereto from the first water drainage passage 60. On an upper portion of the water sealing unit 66, a gas discharge passage 76 is provided for discharging the gas (hydrogen) inside the water sealing unit 66. A back pressure valve 78 that acts as a pressure retaining mechanism is disposed in the gas discharge passage 76. More specifically, the back pressure valve 78 is set at a higher pressure (for example, 70 kPa) than the pressure (for example, 20 kPa) inside the water supplying gas-liquid separator 36. The pressure retaining mechanism may also be in the form of a check valve.

The second water drainage passage 68 is a passage for guiding the liquid water inside the water sealing unit 66 to the water supplying gas-liquid separator 36. The second water drainage passage 68 mutually connects the lower portion of the water sealing unit 66 and the upper portion of the water supplying gas-liquid separator 36 to each other. The third water drainage valve 70 is an on-off valve (solenoid valve) that can be switched between a valve open state in which the second water drainage passage 68 is opened, and a valve closed state in which the second water drainage passage 68 is closed.

The pressure release system 20 releases the pressure of the hydrogen (high pressure hydrogen) on the cathode side of the water electrolysis device 12 at a time that operation of the water electrolysis device 12 is stopped. The pressure release system 20 includes a pressure release passage 80, a pressure reducing valve 82, and a pressure release valve 84. The pressure release passage 80 mutually connects a midway portion of the first hydrogen supply passage 50 and an upper portion of the water sealing unit 66 to each other. The pressure reducing valve 82 and the pressure release valve 84 are disposed in the pressure release passage 80 along a hydrogen flow direction (a direction from the first hydrogen supply passage 50 toward the water sealing unit 66). An outlet pressure of the pressure reducing valve 82 is set to be higher than the pressure inside the water supplying gas-liquid separator 36. The pressure release valve 84 is an on-off valve (solenoid valve) that can be switched between a valve open state in which the pressure release passage 80 is opened, and a valve closed state in which the pressure release passage 80 is closed.

A second power source 86 is electrically connected to the control unit 22. The second power source 86 is configured to be capable of supplying electrical power to the control unit 22 at a time of a power failure of the first power source 28.

Output signals from a first pressure gauge 88a, a second pressure gauge 88b, a third pressure gauge 88c, a first water level detecting sensor 90a, a second water level detecting sensor 90b, and a hydrogen detecting sensor 92 (hydrogen detector) are input to the control unit 22. The first pressure gauge 88a detects a pressure (first pressure PT1) of the hydrogen that is led out from the water electrolysis device 12, and is disposed in the first hydrogen supply passage 50 in the vicinity of the water electrolysis device 12. However, the position of the first pressure gauge 88a can be changed arbitrarily.

More specifically, the first hydrogen supply passage 50 communicates with the second hydrogen supply passage 52 through the interior of the gas-liquid separator 48. Therefore, the pressure inside the first hydrogen supply passage 50 is of the same pressure as the pressure inside the gas-liquid separator 48, as well as the pressure in the second hydrogen supply passage 52 on an upstream side of the back pressure valve 54. Accordingly, the first pressure gauge 88a may be disposed in the second hydrogen supply passage 52 on an upstream side of the back pressure valve 54 (on the side of the gas-liquid separator 48), or may be disposed in the gas-liquid separator 48.

The second pressure gauge 88b detects a pressure (second pressure PT2) inside the water sealing unit 66, and is disposed in the water sealing unit 66. The third pressure gauge 88c detects a pressure (third pressure PT3) in a segment of the pressure release passage 80 between the pressure reducing valve 82 and the pressure release valve 84.

The first water level detecting sensor 90a is provided in the gas-liquid separator 48, and detects a water level (first water level LS1) of the liquid water inside the gas-liquid separator 48. The second water level detecting sensor 90b is provided in the water sealing unit 66, and detects a water level (second water level LS2) of the liquid water inside the water sealing unit 66. The hydrogen detecting sensor 92 is provided in the exhaust passage 44, and detects a hydrogen concentration HS1 inside the exhaust passage 44.

The control unit 22 is a calculating device including a microcomputer, which includes a CPU (central processing unit), and a ROM, a RAM, and the like, serving as memories. The CPU, by reading and executing programs recorded in the ROM, functions as various function realizing units (function realizing means). The various function realizing units can also be constituted by function realizing devices in the form of hardware.

The control unit 22 carries out control of operations of the entire water electrolysis system 10. The control unit 22 is equipped with a determination unit 94 and a valve control unit 96. The determination unit 94 determines whether or not operation of the water electrolysis device 12 has been stopped. More specifically, the determination unit 94 determines that operation of the water electrolysis device 12 has been stopped when the supply of electrical power from the first power source 28 to the water electrolysis device 12 is stopped. The valve control unit 96 switches each of the first water drainage valve 62, the second water drainage valve 64, the third water drainage valve 70, and the pressure release valve 84, between a valve open state and a valve closed state. Moreover, by electrical power from the second power source 86, the valve control unit 96 is capable of switching the first water drainage valve 62, the second water drainage valve 64, the third water drainage valve 70, and the pressure release valve 84 between valve open and valve closed states, even when a power failure occurs in the first power source 28.

Next, a description will be given of an operation of supplying hydrogen to the hydrogen storage device 200 using the water electrolysis system 10 according to the present embodiment.

When operation of the water electrolysis system 10 is initiated, under an action of the circulation pump 40, the water inside the water supplying gas-liquid separator 36 is supplied to the anode side inlet 30a of the water electrolysis device 12 via the water supply passage 38. On the other hand, a voltage is applied to the water electrolysis device 12 via the first power source 28 which is electrically connected thereto. Therefore, in each of the water decomposing cells 24, on the anode side thereof, pure water is decomposed by electricity to thereby generate hydrogen ions, electrons, and oxygen. Accordingly, on the cathode side thereof, the hydrogen ions are combined with electrons to obtain hydrogen, and the hydrogen is extracted via the cathode side outlet 30c into the first hydrogen supply passage 50.

On the other hand, on the anode side outlet 30b, oxygen generated due to the reaction and unreacted water are made to flow, and such combined fluids are discharged into the discharge passage 42. The oxygen and the unreacted water are introduced into the water supplying gas-liquid separator 36 and are mutually separated. The separated water is stored in the water supplying gas-liquid separator 36. The separated oxygen is discharged to the exterior from the exhaust passage 44.

The hydrogen generated in the water electrolysis device 12 is sent to the gas-liquid separator 48 via the first hydrogen supply passage 50. In the gas-liquid separator 48, liquid water is separated from hydrogen and stored in the gas-liquid separator 48. Hydrogen from which the liquid water has been separated is led out into the second hydrogen supply passage 52. After the pressure of the hydrogen has risen to a set pressure (for example, 70 MPa) of the back pressure valve 54, the hydrogen is dehumidified by a non-illustrated dehumidifier or the like to become dry hydrogen (product hydrogen), and is supplied to the hydrogen storage device 200 of a fuel cell electric vehicle or the like.

Next, the method of stopping operation of the water electrolysis system 10 will be described. In an initial stage of carrying out the method of stopping operation of the water electrolysis system 10, the first water drainage valve 62, the second water drainage valve 64, the third water drainage valve 70, and the pressure release valve 84 each are placed in a valve closed state.

Figure 2:
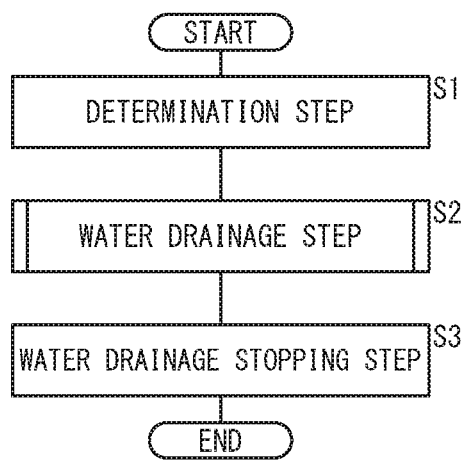
FIG. 2 is a flowchart for describing a method of stopping operation of the water electrolysis system according to an embodiment of the present invention.

As shown in FIG. 2, initially, in step S1, a determination step is performed. In the determination step, the determination unit 94 determines whether or not operation of the water electrolysis device 12 has been stopped. More specifically, the determination unit 94 determines that operation of the water electrolysis device 12 has been stopped when the supply of electrical power from the first power source 28 to the water electrolysis device 12 is stopped.

In the present embodiment, the control unit 22 controls the first power source 28 in a manner so that supply of electrical power from the first power source 28 to the water electrolysis device 12 is stopped at a time that charging of hydrogen in the hydrogen storage device 200 has been completed. However, the control unit 22 may also control the first power source 28 in a manner so that supply of electrical power from the first power source 28 to the water electrolysis device 12 is stopped on the basis of a non-illustrated switch being operated by a user. Further, the supply of power from the first power source 28 to the water electrolysis device 12 is also stopped in the case that the first power source 28 has experienced a power failure.

Subsequently, in step S2, a water drainage step is performed. In the water drainage step, initially, in step S10 of FIG. 3, a first water drainage step is performed.

Figure 4:
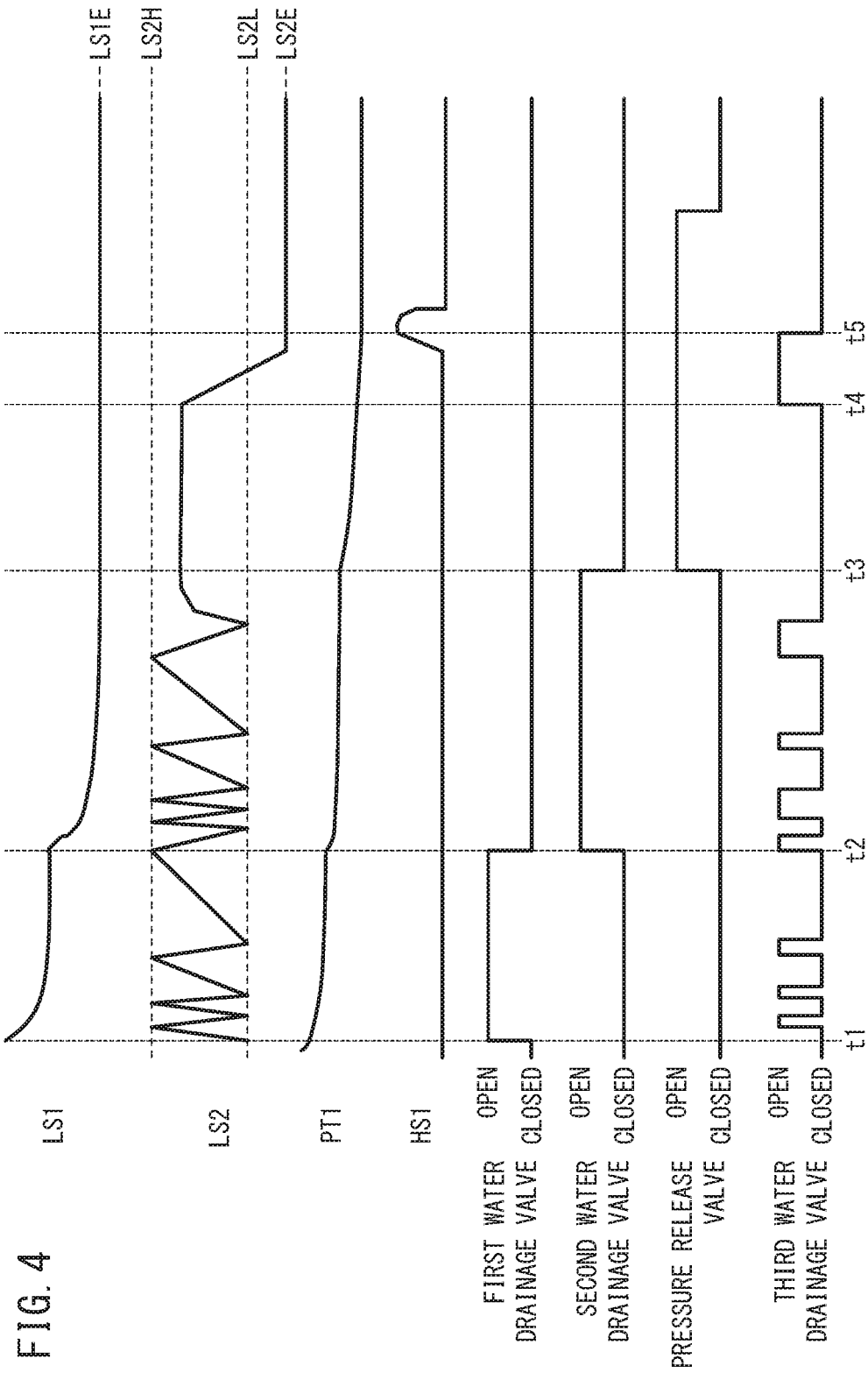
FIG. 4 is a timing chart for describing the method of stopping operation of the water electrolysis system.
Figure 5:
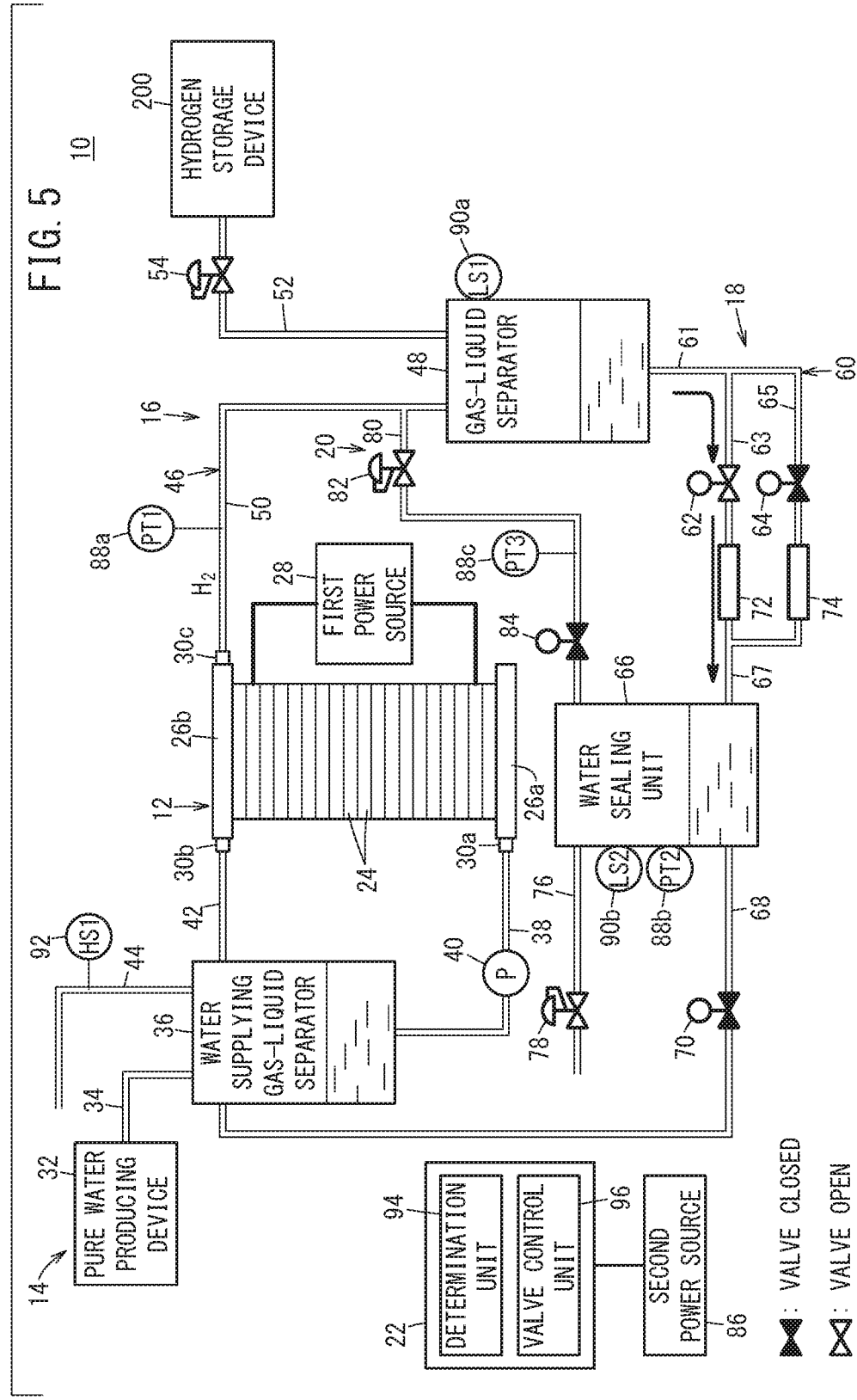
FIG. 5 is an explanatory diagram of operations of a first water drainage step of the water electrolysis system shown in FIG. 1.

In the first water drainage step, as shown in FIG. 5 and at time t1 in FIG. 4, the valve control unit 96 controls the first water drainage valve 62 to be placed in a valve open state. Consequently, the liquid water inside the gas-liquid separator 48 is drained into the water sealing unit 66 via the outlet path 61, the first flow path 63, and the connecting path 67. At this time, the liquid water is reduced in pressure by passing through the first pressure loss unit 72.

Figure 6:
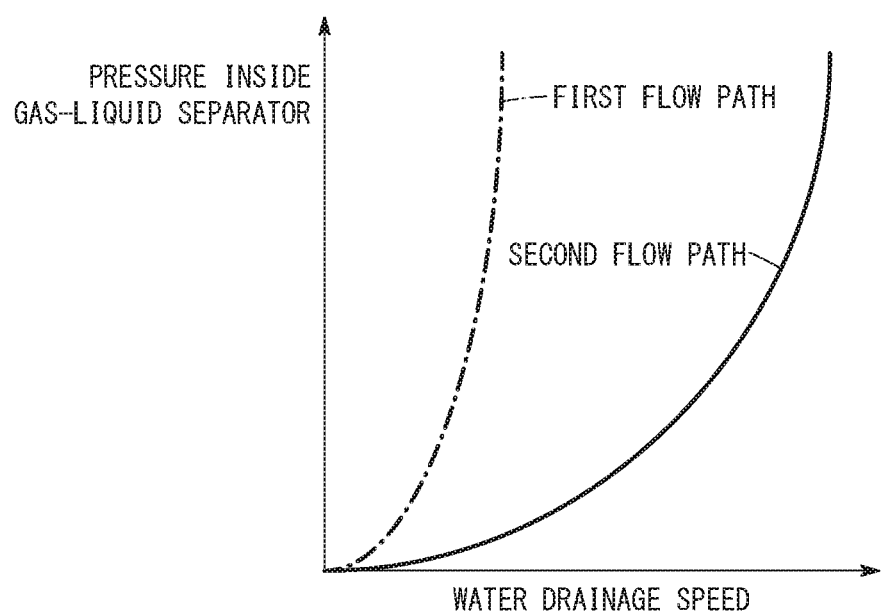
FIG. 6 is a graph showing a relationship between pressure in a gas-liquid separator and a water drainage speed.

In the first water drainage step, because the water drainage speed (drainage flow rate) of the liquid water inside the gas-liquid separator 48 is regulated by the first pressure loss unit 72, the water drainage speed depends on the pressure of the hydrogen inside the gas-liquid separator 48. More specifically, the water drainage speed of the liquid water inside the gas-liquid separator 48 decreases as the water level inside the gas-liquid separator 48 decreases, and as the pressure of the hydrogen inside the gas-liquid separator 48 decreases (refer to the one-dot-dashed line in the graph of FIG. 6). Therefore, in the case that the liquid water inside the gas-liquid separator 48 is drained into the first flow path 63, there is a water drainage limit point at which the water level inside the gas-liquid separator 48 hardly decreases at all (water drainage cannot be performed).

Figure 3:
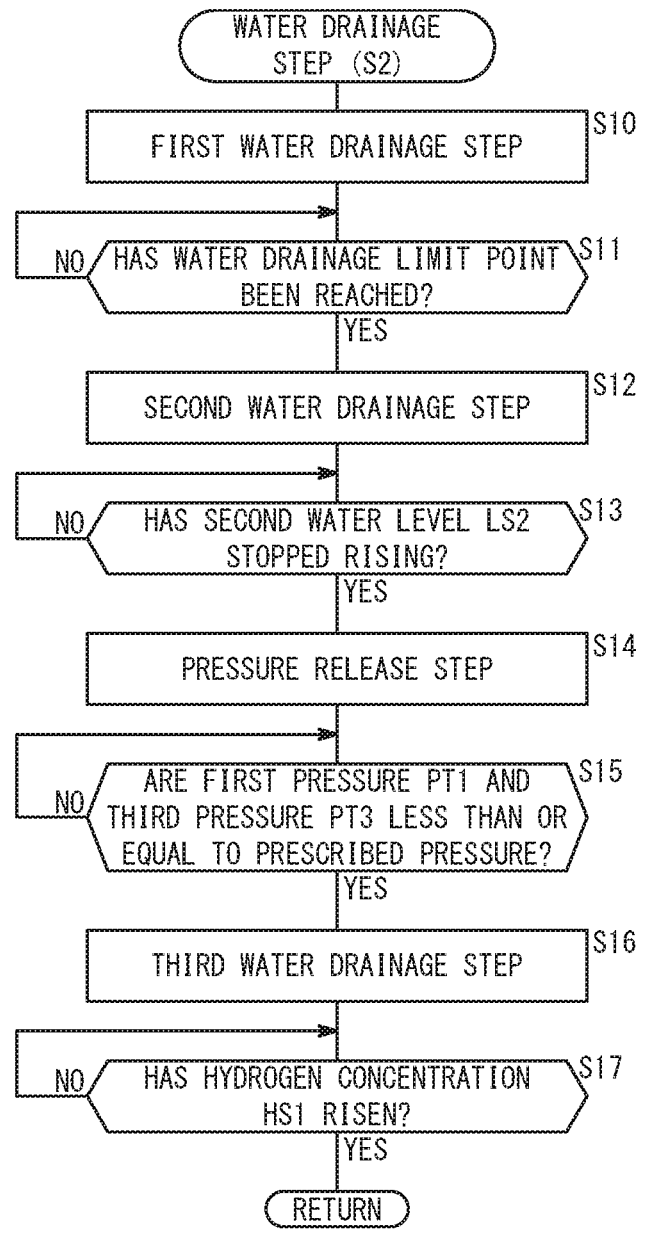
FIG. 3 is a flowchart for describing a water drainage process shown in FIG. 2.

Thus, in step S11 of FIG. 3, the control unit 22 determines whether or not the water drainage limit point of the first flow path 63 has been reached. More specifically, the control unit 22 determines that the water drainage limit point has been reached when a first water level LS1 inside the gas-liquid separator 48, as detected by the first water level detecting sensor 90a, has not decreased for a predetermined time period. However, the control unit 22 may also determine that the water drainage limit point has been reached when the pressure detected by the first pressure gauge 88a has become lower than a reference pressure.

In the case that the control unit 22 does not determine that the water drainage limit point has been reached (step S11: NO), the process of step S11 is performed again. At this time, the first water drainage step is continuously carried out. On the other hand, in the case that the control unit 22 determines that the water drainage limit point has been reached (step S11: YES), the second water drainage step is performed in step S12.

Figure 7:
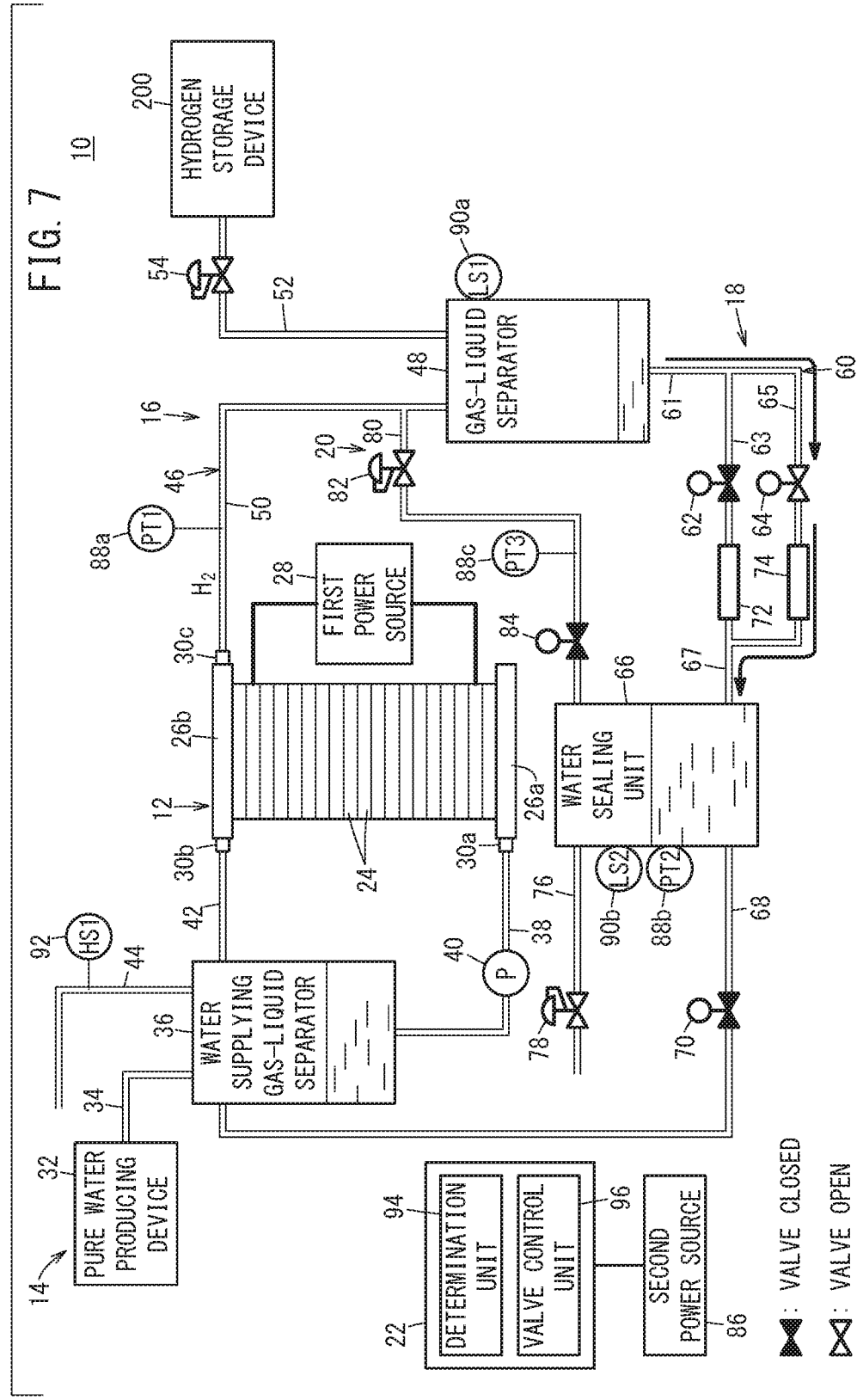
FIG. 7 is an explanatory diagram of operations of a second water drainage step of the water electrolysis system shown in FIG. 1.

In the second water drainage step, as shown in FIG. 7 and at time t2 in FIG. 4, the valve control unit 96 controls the first water drainage valve 62 to be placed in a valve closed state, and controls the second water drainage valve 64 to be placed in a valve open state. Consequently, the liquid water inside the gas-liquid separator 48 is drained into the water sealing unit 66 via the outlet path 61, the second flow path 65, and the connecting path 67. At this time, the liquid water is reduced in pressure by passing through the second pressure loss unit 74.

In the second water drainage step, the water drainage flow rate of the liquid water inside the gas-liquid separator 48 is regulated by the second pressure loss unit 74. In addition, the pressure loss of the second pressure loss unit 74 is smaller than the pressure loss of the first pressure loss unit 72. Therefore, even in the case that the pressure inside the gas-liquid separator 48 has decreased, a comparatively high water drainage speed can be attained (refer to the solid line in the graph of FIG. 6).

Consequently, the liquid water inside the gas-liquid separator 48 is smoothly drained into the water sealing unit 66 via the second flow path 65.

Further, as shown in FIG. 4, during a period from the start of the first water drainage step until the end of the second water drainage step (from time t1 to time t3), the control unit 22 adjusts a second water level LS2 inside the water sealing unit 66 so as to lie within a predetermined range.

More specifically, when the second water level LS2 inside the water sealing unit 66 has reached a first reference water level LS2H, the control unit 22 controls the third water drainage valve 70 to be placed in a valve open state. The first reference water level LS2H is an upper limit value of the second water level LS2 during normal operation of the water electrolysis system 10. Owing to this feature, the liquid water inside the water sealing unit 66 is drained into the water supplying gas-liquid separator 36 via the second water drainage passage 68.

Further, when the second water level LS2 inside the water sealing unit 66 has reached a second reference water level LS2L, the control unit 22 controls the third water drainage valve 70 to be placed in a valve closed state. The second reference water level LS2L is a lower limit value of the second water level LS2 during normal operation of the water electrolysis system 10. Owing to this feature, draining of the liquid water from the water sealing unit 66 into the water supplying gas-liquid separator 36 is stopped. Stated otherwise, during a period in which the first water drainage step and the second water drainage step are performed, the second water level LS2 inside the water sealing unit 66 is maintained at a water level between the water level upper limit value and the water level lower limit value.

Thereafter, in step S13 of FIG. 3, the control unit 22 determines whether or not the second water level LS2 inside the water sealing unit 66, as detected by the second water level detecting sensor 90b, has stopped rising. In the case that the control unit 22 determines that the second water level LS2 inside the water sealing unit 66 is rising (step S13: NO), the process of step S13 is performed again. At this time, the second water drainage step is continuously carried out.

On the other hand, in the case that the control unit 22 determines that the first water level LS1 inside the gas-liquid separator 48 has reached a first lower limit value LS1E (see FIG. 4) and the second water level LS2 inside the water sealing unit 66 has stopped rising (step S13: YES), a pressure release step is carried out in step S14. The first lower limit value LS1E is a water level at which the first water level LS1 inside the gas-liquid separator 48 becomes zero. Stated otherwise, when the first water level LS1 reaches the first lower limit value LS1E, all of the liquid water has been drained from the interior of the gas-liquid separator 48.

Figure 8:
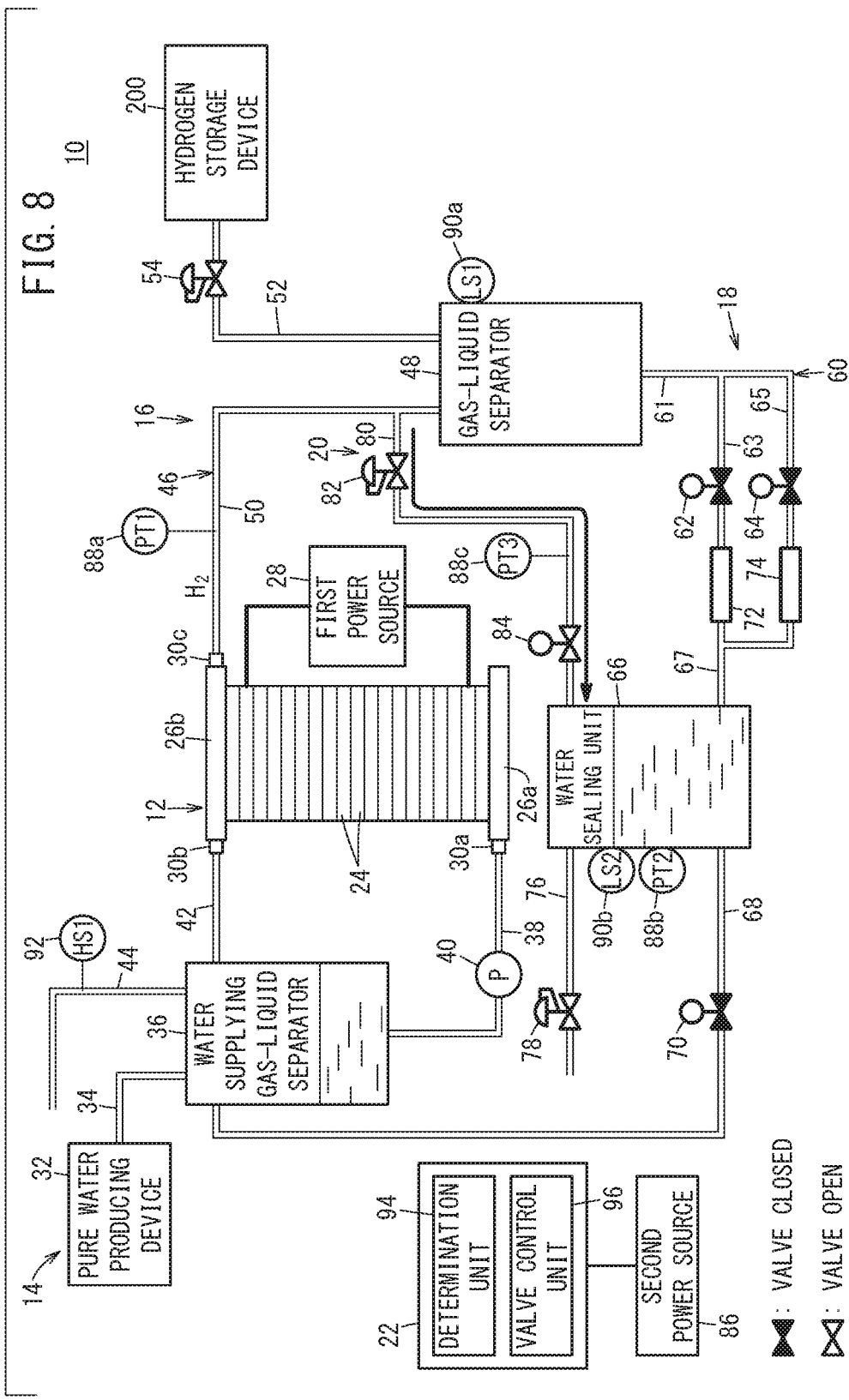
FIG. 8 is an explanatory diagram of operations of a pressure releasing step of the water electrolysis system shown in FIG. 1.

In the pressure release step, as shown in FIG. 8 and at time t3 in FIG. 4, the control unit 22 controls the second water drainage valve 64 to be placed in a valve closed state, together with controlling the pressure release valve 84 to be placed in a valve open state. Upon doing so, the hydrogen remaining inside the water electrolysis device 12, the hydrogen supply passage 46, and the gas-liquid separator 48 is introduced into the water sealing unit 66 via the pressure release passage 80. Stated otherwise, the water electrolysis device 12 is depressurized. Consequently, the second pressure PT2 inside the water sealing unit 66 rises. Moreover, any surplus hydrogen is discharged to the exterior under a valve opening action of the back pressure valve 78.

Subsequently, in step S15 of FIG. 3, the control unit 22 determines whether or not the first pressure PT1 detected by the first pressure gauge 88a and the third pressure PT3 detected by the third pressure gauge 88c have become less than or equal to a prescribed pressure (for example, 1 MPa). In the case it is determined by the determination unit 94 that the first pressure PT1 and the third pressure PT3 are greater than the prescribed pressure (step S15: NO), the process of step S15 is performed again. At this time, the pressure release step is continuously carried out. On the other hand, in the case it is determined by the control unit 22 that the first pressure PT1 and the third pressure PT3 have become less than or equal to the prescribed pressure (step S15: YES), a third water drainage step is carried out in step S16.

Figure 9:
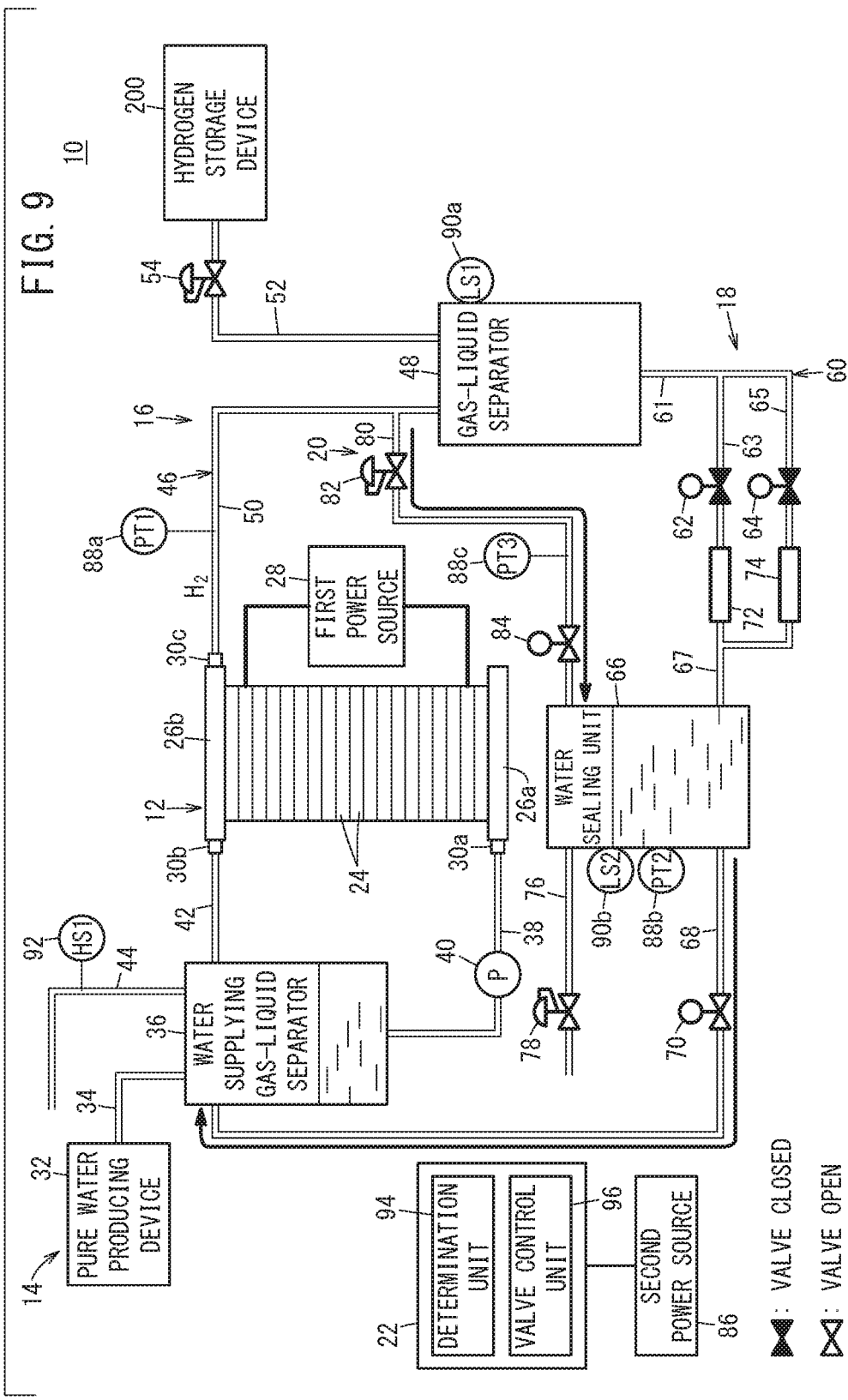
FIG. 9 is an explanatory diagram of operations of a third water drainage step of the water electrolysis system shown in FIG. 1.

In the third water drainage step, as shown in FIG. 9 and at time t4 in FIG. 4, the control unit 22 controls the third water drainage valve 70 to be placed in a valve open state. Upon doing so, the liquid water inside the water sealing unit 66 is drained into the water supplying gas-liquid separator 36 via the second water drainage passage 68. Consequently, the second water level LS2 inside the water sealing unit 66 decreases.

Further, in step S17 of FIG. 3, the control unit 22 determines whether or not the hydrogen concentration HS1 detected by the hydrogen detecting sensor 92 has risen. Stated otherwise, the control unit 22 determines whether or not hydrogen is detected by the hydrogen detecting sensor 92. In the case that the control unit 22 determines that the hydrogen concentration HS1 is not rising (step S17: NO), the process of step S17 is performed again. At this time, the third water drainage step is continuously carried out.

On the other hand, when the second water level LS2 inside the water sealing unit 66 reaches a second lower limit value LS2E (see FIG. 4), and all of the liquid water inside the water sealing unit 66 is drained into the water supplying gas-liquid separator 36, the hydrogen inside the water sealing unit 66 is introduced into the water supplying gas-liquid separator 36 via the second water drainage passage 68. The second lower limit value LS2E is a water level at which the second water level LS2 inside the water sealing unit 66 becomes zero. Stated otherwise, when the second water level LS2 reaches the second lower limit value LS2E, all of the liquid water has been drained from the interior of the water sealing unit 66.

When this occurs, since the hydrogen inside the water supplying gas-liquid separator 36 is discharged into the exhaust passage 44, hydrogen is detected by the hydrogen detecting sensor 92. Stated otherwise, the hydrogen concentration HS1 detected by the hydrogen detecting sensor 92 rises. In addition, in the case that the control unit 22 determines that the hydrogen concentration HS1 has risen (step S17: YES), a water drainage stopping step is performed in step S3 of FIG. 2.

Figure 10:
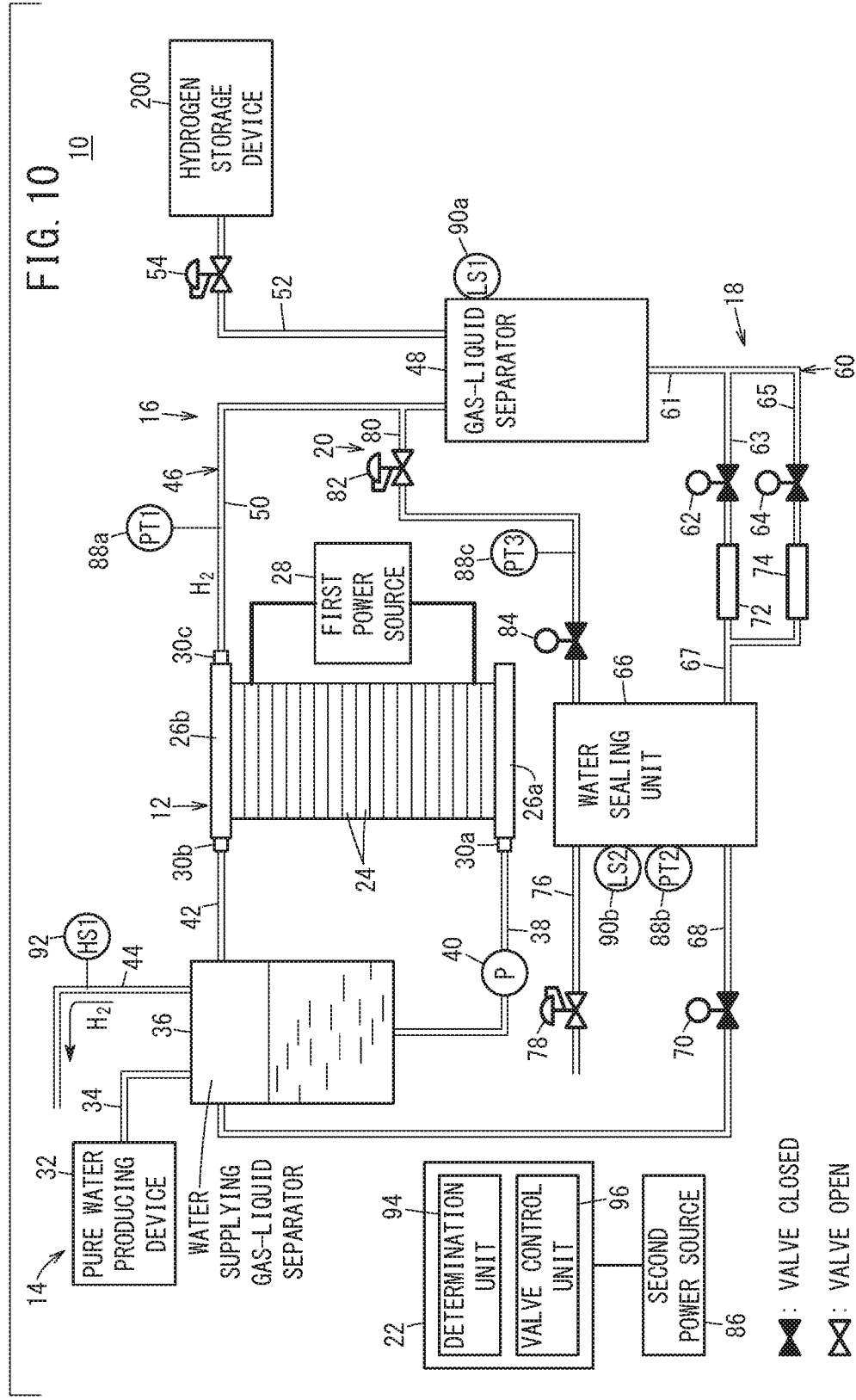
FIG. 10 is an explanatory diagram of operations of a water drainage stopping step of the water electrolysis system shown in FIG. 1.

In the water drainage stopping step, as shown in FIG. 10 and at time t5 in FIG. 4, the valve control unit 96 controls the third water drainage valve 70 to be placed in a valve closed state. Upon doing so, introduction of the hydrogen inside the water sealing unit 66 into the water supplying gas-liquid separator 36 is stopped. Thereafter, the control unit 22 controls the pressure release valve 84 to be placed in a valve closed state. At this stage, the process of the flowchart is brought to an end.

In this case, the water electrolysis system 10 and the method for stopping operation of the water electrolysis system 10 according to the present embodiment achieve the following advantageous effects.

According to the above-described water electrolysis system 10, in the case that the determination unit 94 determines that operation of the water electrolysis device 12 has been stopped, the valve control unit 96 controls the water drainage valves (the first water drainage valve 62 and the second water drainage valve 64) to be placed in a valve open state. Consequently, the liquid water inside the gas-liquid separator 48 can be drained into the first water drainage passage 60 when operation of the water electrolysis device 12 is stopped. Thus, with a simple configuration (without using a heater), freezing of the liquid water inside the gas-liquid separator 48 can be suppressed, even in a cold climate, or during winter or the like.

The first water drainage passage 60 includes the first flow path 63 and the second flow path 65 which are disposed mutually in parallel. The first water drainage valve 62 is disposed in the first flow path 63, and the second water drainage valve 64 is disposed in the second flow path 65. The pressure loss of the second flow path 65 is set to be smaller than the pressure loss of the first flow path 63. In addition, in the first water drainage step, in the case that the determination unit 94 determines that operation of the water electrolysis device 12 has been stopped, the valve control unit 96 controls the first water drainage valve 62 to be placed in a valve open state, together with controlling the second water drainage valve 64 to be placed in a valve closed state. In accordance with this feature, immediately after operation of the water electrolysis device 12 has been stopped (when the pressure inside the hydrogen supply passage 46 is relatively high), the liquid water inside the gas-liquid separator 48 can be drained while lowering the pressure in the first flow path 63.

Thereafter, in the second water drainage step, the valve control unit 96 controls the second water drainage valve 64 to be placed in a valve open state. Consequently, when the pressure inside the gas-liquid separator 48 decreases (when the water drainage limit point is reached), it is possible to smoothly drain the liquid water inside the gas-liquid separator 48 into the second flow path 65. The water electrolysis system 10 is equipped with the water sealing unit 66, the second water drainage passage 68 (water sealing unit drainage passage), the pressure release passage 80, and the pressure release valve 84. In addition, in the case that the determination unit 94 determines that operation of the water electrolysis device 12 has been stopped, after the liquid water inside the gas-liquid separator 48 has been introduced into the water sealing unit 66, the valve control unit 96 controls the pressure release valve 84 to be placed in a valve open state.

In accordance with this feature, since the hydrogen inside the hydrogen supply passage 46 can be introduced into the water sealing unit 66 via the pressure release passage 80, the pressure inside the water sealing unit 66 can be increased. Consequently, using the hydrogen inside the water sealing unit 66, it is possible to smoothly drain the liquid water inside the water sealing unit 66 into the second water drainage passage 68.

The water electrolysis system 10 is equipped with the water supplying gas-liquid separator 36, the exhaust passage 44, the hydrogen detecting sensor 92 (hydrogen detector), and the third water drainage valve 70 (water sealing unit drainage valve). In addition, with the pressure release valve 84 being in a valve open state, the valve control unit 96 controls the third water drainage valve 70 to be placed in a valve open state, and controls the third water drainage valve 70 to be placed in a valve closed state when hydrogen is detected by the hydrogen detecting sensor 92.

In accordance with this feature, since the third water drainage valve 70 is placed in a valve open state with the pressure release valve 84 being in a valve open state, all of the liquid water inside the water sealing unit 66 is introduced into the water supplying gas-liquid separator 36, and thereafter, the hydrogen inside the water sealing unit 66 is introduced into the water supplying gas-liquid separator 36. Then, since the third water drainage valve 70 is placed in a valve closed state when hydrogen is detected by the hydrogen detecting sensor 92, all of the liquid water inside the water sealing unit 66 can be reliably drained into the water supplying gas-liquid separator 36. Accordingly, with a simple configuration, freezing of the liquid water inside the gas-liquid separator 48 and the water drainage system 18 (the first water drainage passage 60, the water sealing unit 66, and the second water drainage passage 68) can be suppressed when operation of the water electrolysis device 12 is stopped. Further, it is possible to prevent leakage of hydrogen to the exterior.

The water electrolysis system 10 is equipped with the first power source 28 for applying the electrolysis voltage to the water electrolysis device 12, and the second power source 86 capable of supplying electrical power to the control unit 22 at a time of a power failure of the first power source 28. In addition, the determination unit 94 determines that operation of the water electrolysis device 12 has been stopped when a power failure has occurred in the first power source 28. Therefore, even if a power failure occurs in the first power source 28, the liquid water inside the gas-liquid separator 48 can be drained into the first water drainage passage 60.

The present invention is not limited to the configuration described above. The second pressure loss unit 74 may be eliminated. In this case, since the pressure loss of the second flow path 65 can be made lower than a case in which the second pressure loss unit 74 is provided, the liquid water inside the gas-liquid separator 48 can be drained smoothly into the water sealing unit 66 via the second flow path 65.

Further, a water draining mechanism (a water drainage passage and a water drainage valve) for draining the water inside the water supplying gas-liquid separator 36 to the exterior may be provided in the water supplying gas-liquid separator 36. In this case, when operation of the water electrolysis device 12 is stopped, the liquid water introduced from the gas-liquid separator 48 into the water supplying gas-liquid separator 36 can be drained by the water draining mechanism to the exterior from the interior of the water supplying gas-liquid separator 36. Accordingly, with a simple configuration, freezing of the liquid water inside the water supplying gas-liquid separator 36 can be suppressed.

Furthermore, in the second water drainage step, the second water drainage valve 64 may be placed in a valve open state while the first water drainage valve 62 is kept in a valve open state (without being placed in a valve closed state). In this case as well, the liquid water inside the gas-liquid separator 48 can be drained smoothly into the water sealing unit 66 via the second flow path 65.

The water electrolysis system and the method of stopping operation thereof according to the present invention are not limited to the above-described embodiments, and it goes without saying that various alternative or additional configurations could be adopted therein without departing from the scope of the present invention.

What is claimed is:

1. A water electrolysis system, comprising:
   a water electrolysis device configured to generate hydrogen and oxygen by performing electrolysis on supplied water;
   a water supply passage configured to supply the water to the water electrolysis device;
   a hydrogen supply passage configured to supply the hydrogen which was generated by the water electrolysis device to a hydrogen storage device;
   a gas-liquid separator disposed in the hydrogen supply passage and configured to separate the hydrogen into a gas and a liquid;
   a water drainage passage configured to drain liquid water separated from the hydrogen and stored in the gas-liquid separator;
   a water drainage valve system configured to be switched between a valve open state in which the water drainage passage is opened, and a valve closed state in which the water drainage passage is closed; and
   a control unit comprising a central processing unit that executes computer executable programs stored in a memory, wherein the computer executable programs comprise:
      a determination unit configured to determine whether or not operation of the water electrolysis device has been stopped; and
      a valve control unit configured to, in a case that the determination unit has determined that operation of the water electrolysis device has been stopped, control the water drainage valve system to be placed in the valve open state,
   wherein:
      the hydrogen generated from the water electrolysis device has a pressure higher than atmospheric pressure;
      the water drainage passage has a first flow path and a second flow path disposed mutually in parallel; and
      the water drainage valve system comprises:
         a first water drainage valve configured to be switched between a valve open state in which the first flow path is opened, and a valve closed state in which the first flow path is closed; and
         a second water drainage valve configured to be switched between a valve open state in which the second flow path is opened, and a valve closed state in which the second flow path is closed;
      wherein a pressure loss of the second flow path is set to be smaller than a pressure loss of the first flow path; and
      in a case that the determination unit has determined that operation of the water electrolysis device has been stopped, the valve control unit controls the first water drainage valve to be placed in the valve open state and also controls the second water drainage valve to be placed in the valve closed state, and thereafter controls the second water drainage valve to be placed in the valve open state.

2. The water electrolysis system according to claim 1, further comprising: a water storage container in fluid communication with the first flow path and the second flow path so as to store the liquid water led from the first flow path and the second flow path; a water storage container drainage passage configured to discharge the liquid water inside the water storage container; a pressure release passage configured to connect the hydrogen supply passage or the gas-liquid separator with the water storage container; and a pressure release valve configured to be switched between a valve open state in which the pressure release passage is opened, and a valve closed state in which the pressure release passage is closed; wherein, in the case that the determination unit has determined that operation of the water electrolysis device has been stopped, the valve control unit controls the pressure release valve to be placed in the valve open state, after having introduced the liquid water inside the gas-liquid separator into the water storage container via the water drainage passage.

3. The water electrolysis system according to claim 2, further comprising: a water supplying gas-liquid separator which is disposed in the water supply passage, and into which the liquid water is guided from the water storage container drainage passage; an exhaust passage configured to discharge gas in the water supplying gas-liquid separator; a hydrogen detector disposed in the exhaust passage and configured to detect hydrogen in the exhaust passage; and a water storage container drainage valve configured to be switched between a valve open state in which the water storage container drainage passage is opened, and a valve closed state in which the water storage container drainage passage is closed; wherein the valve control unit controls the water storage container drainage valve to be placed in the valve open state in a state in which the pressure release valve is open, and controls the water storage container drainage valve to be placed in the valve closed state when hydrogen is detected by the hydrogen detector.

4. The water electrolysis system according to claim 1, further comprising:
a first power source configured to apply an electrolysis voltage to the water electrolysis device; and
a second power source configured to supply electrical power to the control unit at a time of a power failure of the first power source;
wherein the determination unit determines that operation of the water electrolysis device has been stopped when a power failure occurs in the first power source.

5. The water electrolysis system according to claim 1, wherein: a first pressure reducing member comprising one of a tube body, an orifice and a pressure reducing valve, the first pressure reducing member being disposed in the first flow path to reduce a pressure of a liquid water that flows through the first flow path; a second pressure reducing member comprising one of another tube body, another orifice and another pressure reducing valve, the second pressure reducing member being disposed in the second flow path to reduce a pressure of a liquid water that flows through the second flow path; and a pressure loss of the second pressure reducing member is set to be smaller than a pressure loss of the first pressure reducing member.

6. A method of stopping operation of a water electrolysis system, the water electrolysis system comprising:
a water electrolysis device configured to generate hydrogen and oxygen by performing electrolysis on supplied water;
a water supply passage configured to supply the water to the water electrolysis device;

a hydrogen supply passage configured to supply the hydrogen which was generated by the water electrolysis device to a hydrogen storage device;
a gas-liquid separator disposed in the hydrogen supply passage and configured to separate the hydrogen into a gas and a liquid;
a water drainage passage configured to drain liquid water separated from the hydrogen and stored in the gas-liquid separator; and
a water drainage valve system configured to be switched between a valve open state in which the water drainage passage is opened, and a valve closed state in which the water drainage passage is closed; and
the method comprising:
a determination step of determining whether or not operation of the water electrolysis device has been stopped; and
a water drainage step of placing the water drainage valve system in the valve open state when it is determined in the determination step that operation of the water electrolysis device has been stopped, thereby draining the liquid water from the gas-liquid separator into the water drainage passage,
wherein:
the hydrogen generated from the hydrogen supply passage has a pressure higher than atmospheric pressure;
the water drainage passage has a first flow path and a second flow path disposed mutually in parallel; and
the water drainage valve system comprises:
a first water drainage valve configured to be switched between a valve open state in which the first flow path is opened, and a valve closed state in which the first flow path is closed; and
a second water drainage valve configured to be switched between a valve open state in which the second flow path is opened, and a valve closed state in which the second flow path is closed;
wherein a pressure loss of the second flow path is set to be smaller than a pressure loss of the first flow path; and
wherein the water drainage step comprises:
a first water drainage step of placing the first water drainage valve in the valve open state, and placing the second water drainage valve in the valve closed state when it is determined in the determination step that operation of the water electrolysis device has been stopped, thereby draining the liquid water from the gas-liquid separator into the first flow path; and
a second water drainage step of placing the second water drainage valve in the valve open state after the first water drainage step, thereby draining the liquid water from the gas-liquid separator into the second flow path.

7. The method of stopping operation of the water electrolysis system according to claim 6, the water electrolysis system further comprising:
a water sealing unit configured to store the liquid water led from the first flow path and the second flow path;
a water sealing unit drainage passage configured to discharge the liquid water inside the water sealing unit;
a pressure release passage configured to connect the hydrogen supply passage or the gas-liquid separator with the water sealing unit; and
a pressure release valve configured to be switched between a valve open state in which the pressure release passage is opened, and a valve closed state in which the pressure release passage is closed;
wherein the water drainage step comprises:

a pressure releasing step of placing the pressure release valve in the valve open state after the second water drainage step, thereby introducing the hydrogen into the water sealing unit; and a third water drainage step of draining the liquid water from the water sealing unit into the water sealing unit drainage passage, by the hydrogen that was introduced into the water sealing unit in the pressure releasing step.

8. The method of stopping operation of the water electrolysis system according to claim 7, the water electrolysis system further comprising:

a water supplying gas-liquid separator which is disposed in the water supply passage, and into which the liquid water is guided from the water sealing unit drainage passage;

an exhaust passage configured to discharge gas in the water supplying gas-liquid separator;

a hydrogen detector disposed in the exhaust passage and configured to detect hydrogen in the exhaust passage; and a water sealing unit drainage valve configured to be switched between a valve open state in which the water sealing unit drainage passage is opened, and a valve closed state in which the water sealing unit drainage passage is closed;

wherein, in the third water drainage step, the water sealing unit drainage valve is placed in the valve open state in a state in which the pressure release valve is open, whereby the liquid water is guided from the water sealing unit to the water supplying gas-liquid separator via the water sealing unit drainage passage; and after the third water drainage step, when hydrogen is detected by the hydrogen detector, a water drainage stopping step of placing the water sealing unit drainage valve in the valve closed state is performed.

9. The method of stopping operation of the water electrolysis system according to claim 6, the water electrolysis system further comprising:

a first power source configured to apply an electrolysis voltage to the water electrolysis device; and a second power source configured to supply electrical power at a time of a power failure of the first power source;

wherein, in the determination step, it is determined that operation of the water electrolysis device has been stopped when a power failure occurs in the first power source; and in the water drainage step, the water drainage valve system is controlled by electrical power supplied from the second power source.

10. The method of stopping operation of the water electrolysis system according to claim 6, wherein the second water drainage step is performed after a water level of the liquid water inside the gas-liquid separator has reached a water drainage limit point in the first water drainage step.

11. The method of stopping operation of the water electrolysis system according to claim 7, wherein the pressure releasing step is performed after a water level inside the gas-liquid separator has reached a lower limit value and a water level inside the water sealing unit has stopped rising.

\* \* \* \* \*